US008761549B2

(12) United States Patent
Rasigade et al.

(10) Patent No.: US 8,761,549 B2
(45) Date of Patent: Jun. 24, 2014

(54) SEMICONDUCTOR ON INSULANT HIGH-RATE COMPACT OPTICAL MODULATOR HAVING A WINDING WAVEGUIDE STRUCTURE

(75) Inventors: Gilles Rasigade, Paris (FR); Laurent Vivien, Vauhallan (FR); Delphine Marris-Morini, Montrouge (FR)

(73) Assignees: Universite Paris Sud 11, Orsay (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 13/498,486

(22) PCT Filed: Sep. 29, 2010

(86) PCT No.: PCT/FR2010/052056
§ 371 (c)(1),
(2), (4) Date: Mar. 27, 2012

(87) PCT Pub. No.: WO2011/039478
PCT Pub. Date: Apr. 7, 2011

(65) Prior Publication Data
US 2012/0183251 A1 Jul. 19, 2012

(30) Foreign Application Priority Data

Sep. 29, 2009 (FR) ...................... 09 56770

(51) Int. Cl.
*G02F 1/035* (2006.01)
(52) U.S. Cl.
USPC .................... 385/2; 385/14; 385/32; 359/254

(58) Field of Classification Search
USPC ........ 385/1–3, 32, 129–132, 40, 14; 359/245, 359/246, 254
See application file for complete search history.

(56) References Cited

U.S. PATENT DOCUMENTS

| 5,394,239 | A | * | 2/1995 | Valette ......................... 356/481 |
| 5,398,256 | A | * | 3/1995 | Hohimer et al. ................ 372/94 |
| 5,513,285 | A | * | 4/1996 | Kawashima et al. ........... 385/16 |
| 5,701,372 | A | * | 12/1997 | Magel et al. .................... 385/24 |
| 5,926,589 | A | * | 7/1999 | Gaeta .............................. 385/16 |
| 5,953,468 | A | * | 9/1999 | Finnila et al. ................... 385/16 |
| 6,593,589 | B1 | | 7/2003 | Osinski et al. |
| 6,731,828 | B2 | * | 5/2004 | Kitou et al. .................... 385/14 |

(Continued)

FOREIGN PATENT DOCUMENTS

WO    2005103782    11/2005

*Primary Examiner* — Kaveh Kianni
*Assistant Examiner* — Zachary A Nemtzow
(74) *Attorney, Agent, or Firm* — Greer, Burns & Crain, Ltd.

(57) ABSTRACT

A component, device and improved electro-optical modulation system for increasing compactness, favoring the adaptation of optical and electrical waves, and a method of fabrication. Such a component exhibits a waveguide architecture devised so that the length of the path followed by the luminous flux exhibits, with the length of the path traversed by the electrical control signal, a determined difference for decreasing or compensating for the difference in the speeds of propagation of the luminous flux and of the electrical signal. In particular, the modulation zone includes a path of the luminous flux winding around itself and successively crossing at least two indentations emanating from at least two of these control elements. It thus exhibits a length greater than that traversed by the electrical signal, for example between a first and a second region of interaction between this control signal and this luminous flux.

13 Claims, 9 Drawing Sheets

(56) References Cited

U.S. PATENT DOCUMENTS

| | | | |
|---|---|---|---|
| 6,843,590 B2* | 1/2005 | Jones et al. | 362/554 |
| 6,922,510 B2* | 7/2005 | Hatanaka | 385/50 |
| 7,085,443 B1 | 8/2006 | Gunn, III et al. | |
| 7,116,853 B2 | 10/2006 | Gunn, III et al. | |
| 7,136,565 B1* | 11/2006 | Edwards | 385/132 |
| 7,164,812 B2* | 1/2007 | Depeursinge et al. | 385/12 |
| 7,471,859 B2* | 12/2008 | Levner et al. | 385/37 |
| 7,515,775 B1 | 4/2009 | Kucharski et al. | |
| 7,657,146 B2 | 2/2010 | Laval et al. | |
| 2002/0191935 A1* | 12/2002 | Gao | 385/132 |
| 2003/0002780 A1* | 1/2003 | Nir | 385/17 |
| 2004/0076372 A1* | 4/2004 | Philipsen et al. | 385/24 |
| 2004/0120624 A1 | 6/2004 | Amparan et al. | |
| 2006/0182384 A1* | 8/2006 | Jenkins et al. | 385/14 |
| 2007/0292073 A1 | 12/2007 | Li | |
| 2008/0226215 A1* | 9/2008 | Aoki et al. | 385/2 |

* cited by examiner

SEMICONDUCTOR ON INSULANT HIGH-RATE COMPACT OPTICAL MODULATOR HAVING A WINDING WAVEGUIDE STRUCTURE

The invention relates to an improved electrooptical modulation component to increase the compactness and promote the adaptation of optical and electric waves between them.

According to the invention, such a component has a wave guide architecture arranged such that the length of the path travelled by the light flux has, with the length of the path travelled by the control electric signal, a difference determined to decrease or compensate for the difference in velocities of propagation of the light flux and the electric signal. In particular, this component comprises a path of the light flux within the modulation area with a length higher than that travelled by the electric signal, for example between a first and a second regions of interaction between this control signal and this light flux.

The invention further relates to a method for making such component, as well as a device or system including such component.

TECHNICAL FIELD

The invention is in the field of the silicon photonics, mainly for applications in the fields of optical telecommunications and optical interconnections in integrated circuits.

To make a high-rate information transmission chain, electronic/optical conversion components are required, and the optoelectronic modulator is a key element, enabling information of an electric signal to be transferred onto an optical wave. The invention is concerned with an original compact optoelectronic modulator configuration operating at high-rates (higher than 10 Gbit/s, the typical current applications requiring 10-40 Gbit/s per modulator).

The invention is in the field of optoelectronics and photonics on semiconductor, in particular on silicon. It is usable for numerous optoelectronic applications, and in particular for applications in the fields of optical telecommunications and optical interconnections in integrated circuits.

To make a communication chain comprising both electric signals and light based signals in optical fibres or optical circuits, in particular with a high-rate, electronic/optical conversion components are required. The electrooptical modulator is a key element enabling information to be transferred from an electronic signal to an optical wave, for example to transform digital information in the electronic form into an optical digital signal which will be sent into an optical fibre for a short, middle or long distance transmission.

Other fields of electronics can also use modulators, for example systems for detecting or observing different wavelengths.

State of the Art

The last generation components and optoelectronic systems operate at a rate that can be higher than 10 Gbit/s, and the typical applications of which aim at rates up to 40 Gbit/s per second per chromatic channel for the silicon.

Typically, an electrooptical modulator comprises a modulation area including a wave guide wherein the light flux to be modulated flows. In this modulation area, at least two electrodes apply the modulation electrical signal to an active region including the wave guide.

This modulation area can operate differently and have a different wave guide architecture according to the types of modulators.

The modulation area can for example operate by varying the refractive index of the wave guide, and thereby provide a phase modulation of the light passing therethrough. This modulation area is then arranged to phase modulate part of an incoming light flux, which will then be combined within an interferometer with another part which is not modulated. At the output of the interferometer, this combination gives by interferences an intensity modulation of this light flux. The phase modulating element is incorporated within an interferometer, for example of the Mach-Zenhnder type.

Such a phase modulation area can for example have an architecture similar to that discussed above, with different material and/or light spectrum choices.

A phase modulation area can also be made by flowing the light within a semiconductor wave guide. This wave guide interacts on a certain length with at least two doped regions forming therebetween a diode to which the modulation electric signal is applied. According to the bias voltage applied to this diode, the semiconductor of the wave guide changes its refractive index and thus modifies the velocity of propagation and thereby the light phase travelling through it.

A device of this type is for example described in documents PCT/FR/05/00748 and U.S. Pat. No. 7,116,853, the operation of which is based on several differently doped semiconductors, forming a diode which acts on the reflective index within the wave guide.

Other mechanisms exist, for example a wave guide formed within an active region comprising several layers of different materials forming therebetween quantum wells parallel to the direction of propagation. This active region is surrounded by two groups of electrodes to which the electric signal is applied to bias the active region and vary the effective index of the optical mode propagated in the wave guide.

Drawbacks: Length/compactness

Performances obtained for a given type of modulator, for example in contrast, largely depend on the use of a sufficiently high modulation length, which can currently reach lengths in the order of one or more millimeters.

This length generates some drawbacks, in particular in terms of compactness, since it restricts the integration possibilities within small components and/or integrated circuits.

Drawbacks: Length/rate

The length has also drawbacks in terms of modulation rate. Indeed, light is propagated in the wave guide at a certain velocity, which is different from the velocity of propagation of the modulation electric signal in the electrodes of the modulation diode. Beyond a certain length, this difference in velocities of propagation becomes bothering if the frequency of the modulation signal is increased too much to improve the rate.

Thus, for a given rate, it is often impossible to exceed a certain modulation length, otherwise the signal has a too high deterioration which impedes or prevents its subsequent digital reconstruction from its analog form.

This problem currently forces to make a trade-off choice between the modulation length for the signal quality, and the modulation frequency for the information rate. This is currently a limit, for example to reach or exceed rates of 10 Gbit/s and also 40 Gbit/s in a configuration of a few millimeters for the modulation length.

The use of a ring resonator type interferometer structure enables this copropagation problem between light flux and electric signal to be limited. This type of interferometer is however very temperature sensitive, which restricts the use thereof in numerous applications and/or introduces further constraints on the system engineering concerned for example as regards temperature control, for example due to heat dissipation.

This modulation area can also operate for example by varying the wave guide absorption, and thereby directly provide an intensity modulation of light passing therethrough. It can be for example a wave guide formed within an active region comprising several layers of different materials forming therebetween quantum wells parallel to the direction of propagation. This active region is surrounded by two groups of electrodes to which the electric signal is applied to bias the active area and vary its characteristics of absorption of the light travelling the wave guide.

Document U.S. Pat. No. 6,593,589 describes for example an ISB unipolar modulator operating by absorbing around 5.2 µm, using GaN—AlN or GaN—InN or InGaN—GaN couples. Such components are for example used in radio transmission or detection, to take advantage of atmospheric transparency windows at the wavelengths 3-5 µm and 8-12 µm.

Solutions have been proposed, which consist in designing electrodes with complex and sophisticated shapes, to have an influence on the velocity of propagation or arrival of the electric signal, and in particular to speed it up. This engineering type of electrodes however has limits and numerous constraints, gives rise to complexity and often requires very close manufacturing tolerances which are difficult and costly to reach, in particular in a mass production or if desired to decrease the scrap rate of manufactured components.

In an attempt to adjust the control electric signal, document U.S. Pat. No. 7,515,775 describes an active delay modulator, the control signal of which is transmitted through a series of successive delay lines. The signal is applied to several successive modulation elements, at the output of each delay line. The delay of the signal is adjusted so that the velocity of the modulation signal flowing through the active delay lines corresponds to the optical wave flowing through modulation elements of the circuit. The use of an active delay then enables to get rid of problems of length of the electric electrodes, and save room by curving the optical path within each modulation element (cf. FIG. 12) or by folding it for passing it successively through delay lines arranged in several side by side rows (cf. FIG. 12A).

This type of active solution has however drawbacks, and in particular a complexity and a cost being not inconsiderable, in manufacturing as well in the integration or use, due to the presence of control electronic circuits to adjust the different injection times in the different modulation elements.

One object of the invention is thus to improve the rate performances of the phase or intensity electrooptical modulators, but also the compactness, the integration capacity and the manufacturing simplicity, while restricting the temperature sensitivity and the precision constraints during design and/or manufacture.

To do this, the invention provides an electro-optical component for modulating a light flux as a function of a control electric signal, comprising a modulation area wherein this light flux is propagated in a wave guide and is subjected to the action of at least one first and one second so-called electric control elements, of conducting and/or semi-conducting materials, for example doped in two different ways. Both control elements thereby form a pair of control elements receiving the control electric signal, typically from a pair of electrodes one of each is electrically connected to one of these control elements. Each of these control elements and/or each of these electrodes can besides be formed with a single continuous part, but can also be in several distinct parts receiving the electric control signal in the same way.

According to the invention, the wave guide is arranged such that, in this modulation area, there is at least one first and at least one second regions of interaction between the light flux and the pair of control elements such that the length of the path travelled by said light flux has a determined difference with the length of the path travelled by the control electric signal. More particularly, these lengths are determined such that their difference compensate for, totally or partially, the difference existing between the velocity of propagation of the light flux and the velocity of the electric signal between these first and second regions of interaction, in the meaning of the natural velocity of propagation of this electric signal. This difference in lengths is calculated, upon designing the component, to enable a decrease in this velocity difference to be obtained, by taking into account the relative arrangement of the directions of propagation of the control electric signal in the electrodes and the light flux in the wave guide.

More particularly, in the component according to the invention:

the wave guide is arranged so that the path travelled by the light flux in the modulation area passes at least twice from one control element to the other control element; and said wave guide has, in at least one part of the modulation area, a shape wound on itself and successively passing through at least two indentations emanating from at least two of these control elements and which are interleaved with each other.

The solutions with an active electronic control such as that of document U.S. Pat. No. 7,515,775 attempt to get rid of layout issues by using active circuits to calculate the shift with which the control signal should be applied in discrete portions of the modulation area. The difference in velocities can be made up for or compensate for in a point of each of these discrete portions, but it remains on the rest of each of these portions.

On the contrary, the invention indeed works on the design of this layout in order to make it more effective by its very nature, and in a gradual and continuous way throughout the length of the modulation area.

Thus, by selecting a layout or a drawing of the wave guide designed and calculated with respect to the control elements, a decrease or a compensation for the signal shifts can be obtained while using a passive structure at least with respect to the control elements and electrodes, benefiting from all the advantages thereof. These advantages can then be obtained without resorting to the development of an active control.

These advantages can also be obtained without resorting either to complex engineering techniques of electrodes which were proposed up to now. Indeed, techniques used to draw the shape and the drawing of a wave guide are often less complex, more flexible and require lesser rate dimensional accuracies. Moreover, numerous types of layouts enable such a difference in length to be obtained without requiring great dimensional accuracies, in particular as regards the limits between the different growth or doping areas, such as those usable in embodiments described herein below.

This arrangement may relate to the layout of the wave guide only, for example using control elements with a simple or even rectilinear shape. This arrangement can also act on the shape of the control elements of the active region (for example doped semiconductors of the diode), or by coordinating an engineering of both parts as in interdigitated embodiments described later.

In this currently preferred, so-called wound embodiment, two control elements of at least one pair of electric control elements have, facing each other, a shape comprising indentations interleaved with each other and through which the wave guide successively passes, which wave guide has a shape wound on itself in at least one part of the modulation area.

According to one feature, the wave guide is arranged so that path travelled by the light flux has a spirally wound part passing successively through substantially radial emanations interleaved with each other and extending:

from one of the control elements mostly located inside said spiral on the one hand, et from the other of the control elements mostly located outside and around the spiral on the other hand.

According to another so-called straight embodiment, the wave guide can have a curve shape calculated to obtain an accurate length without being wound on itself. The control elements of at least one pair of electric control elements are provided on either side of the wave guide and have a form surrounding this wave guide between the first and second interaction regions, so that these control elements have a lower length than the wave guide length between this first and second interaction regions.

According to another aspect, the invention also provides a device or a system comprising such a component.

Furthermore, the invention also provides a method for making optoelectronic component comprising steps selected, defined and combined so as to make a defined component such as specified in the present description.

More particularly, the component according to the invention can be of the type wherein the modulation area has an architecture arranged to vary the phase of the light flux passing therethrough as a function of the control electric signal.

Such a phase modulation can be used as such in some applications.

In other applications, at least one such modulation area is inserted within an interferometer, for example a Mach Zehnder one, so as to obtain an intensity modulation of the light flux passing therethrough from the phase modulation of the light flux passing through said modulation area.

It is thus possible to obtain advantageous characteristics of this modulator type, stabilized in temperature, robustness, while restricting the drawbacks due to differences in velocities of propagation such as the limits in flow rate and/or in length and so in modulation contrast.

According to the invention, the wave guide path is calculated to compensate for the difference in velocities of propagation to the nearest 10%, or even 5%, in particular for frequencies of the operating range of the modulator and for example higher than 1 GHz and lower than the cut-off frequency of the component.

Preferably, the invention also provides a device using or including a component according to the invention, not comprising neither electric circuit nor electronic components which would perform a processing of the control signal to compensate for differences in velocities of propagation.

Typically, this modulation area can be obtained by a wave guide made within an active region forming a PN or PIN type diode, as in embodiments described later.

However, it is also possible to apply the arrangement characteristics of the modulation area provided by the invention to a modulation area comprising a wave guide formed in an active region surrounded by at least one pair of control elements of semiconductors, wherein this active region includes at least one structure with one or more quantum wells made from two different III-V type semi-conducting materials.

These are then selected to form a couple of band gap semiconductors and thus obtain a variation in the absorptive effective index in this active region as a function of the electric signal applied to said control elements.

The invention is usable in numerous applications requiring an optical modulation from high-rate electric signals, and in particular in such applications as optical telecommunications, optical interconnections in microprocessors or detection systems.

Varied embodiments of the invention are provided, integrating according to all their possible combinations, the different optional characteristics herein set out.

Further features and advantages of the invention will become clearer from the detailed description of an embodiment in no way limiting, and the appended drawings wherein:

FIG. 3 illustrates a part of the modulation area for control elements forming a PN type diode, and FIG. 4 illustrates a part of the modulation area for control elements forming a PIN type diode, FIG. 5 illustrates two modulation areas with a PN diode symmetrically provided within the Mach Zenhder interferometer of an asymmetric modulator;

FIG. 6 illustrates an alternative with concentric control elements wherein the wave guide is wound on an input spiral and about-turns to leave in an output spiral sandwiched in the input spiral;

FIG. 7 illustrates an alternative with concentric control elements wherein the wave guide comes from the centre and describes a spiral outwardly;

FIG. 8 illustrates the structure of control elements and their electrodes for the examples of FIG. 6 and FIG. 7;

FIG. 9 illustrates an alternative with juxtaposed control elements wherein the wave guide comes from the centre and describes alternated spiral portions outwardly;

Figure 10:
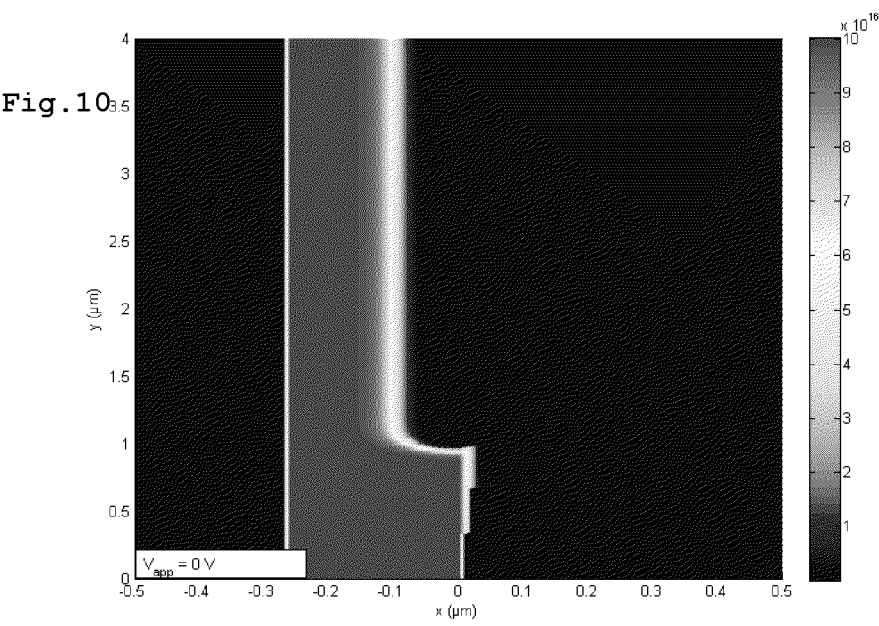
FIG. 10 to FIG. 12 illustrate the charge density distribution within control elements for the wound embodiment, in one part of the sandwiched indentations.
Figure 11:
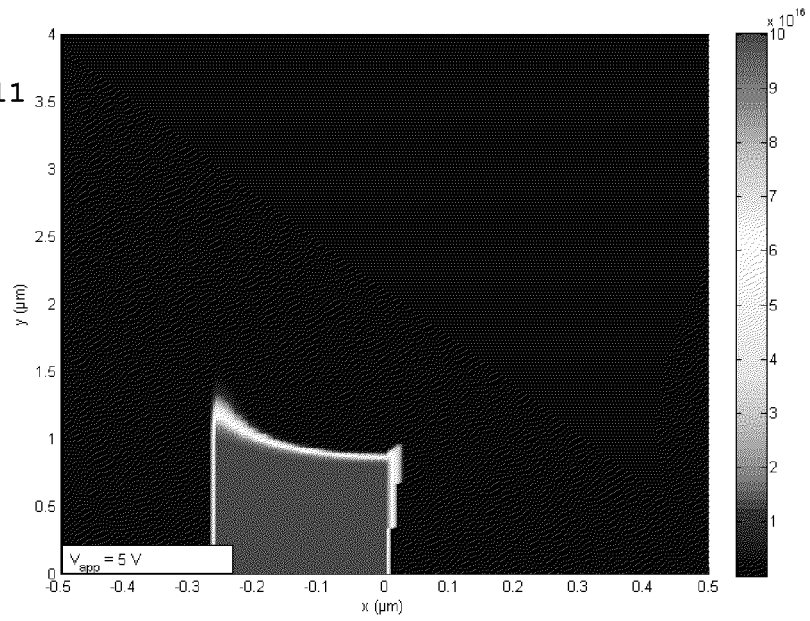
Figure 12:
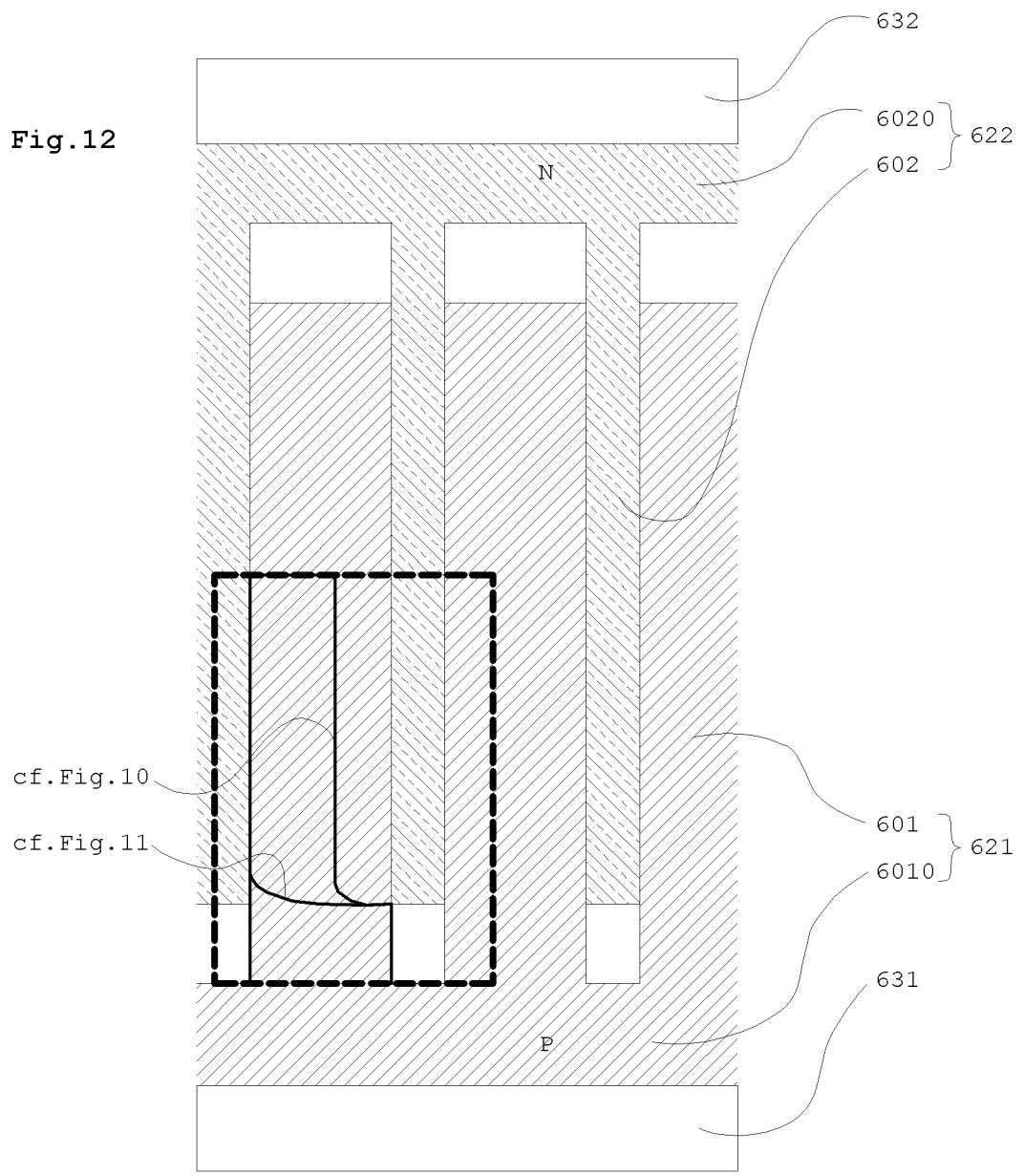

for FIG. 10, in a measurement photography for a 0 V difference in control potential, for FIG. 11, in a measurement photography for a 5 V difference in control potential, for FIG. 12, in a wider scheme illustrating the positioning of the measurements of FIG. 10 and FIG. 11 within the structure of the control elements.

CONTROL ELEMENTS SURROUNDING THE WAVE GUIDE

Figure 1:
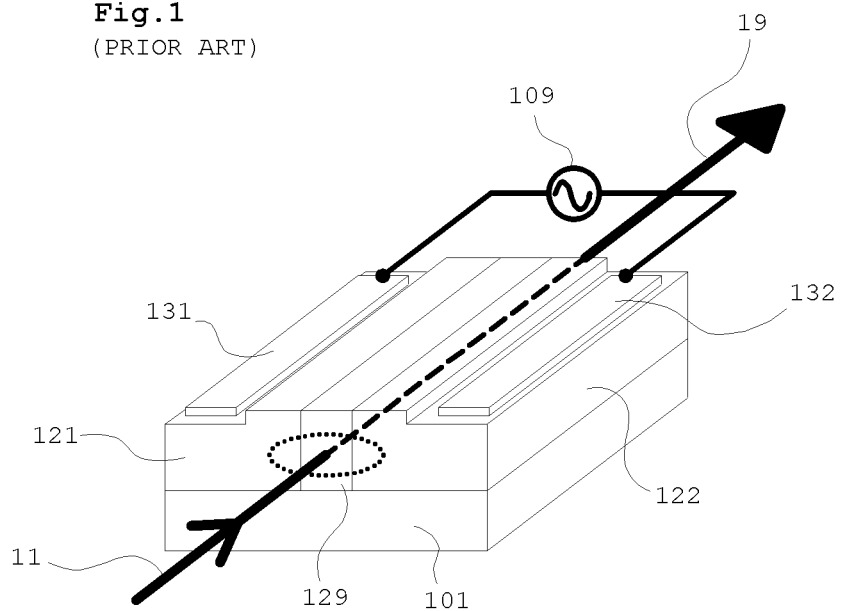
FIG. 1 is a perspective cross-section view illustrating an example of prior art comprising a PIN type diode in a side configuration with a vertical doped plane in its intrinsic region, such as illustrated in document WO 2005/093480.
Figure 2:
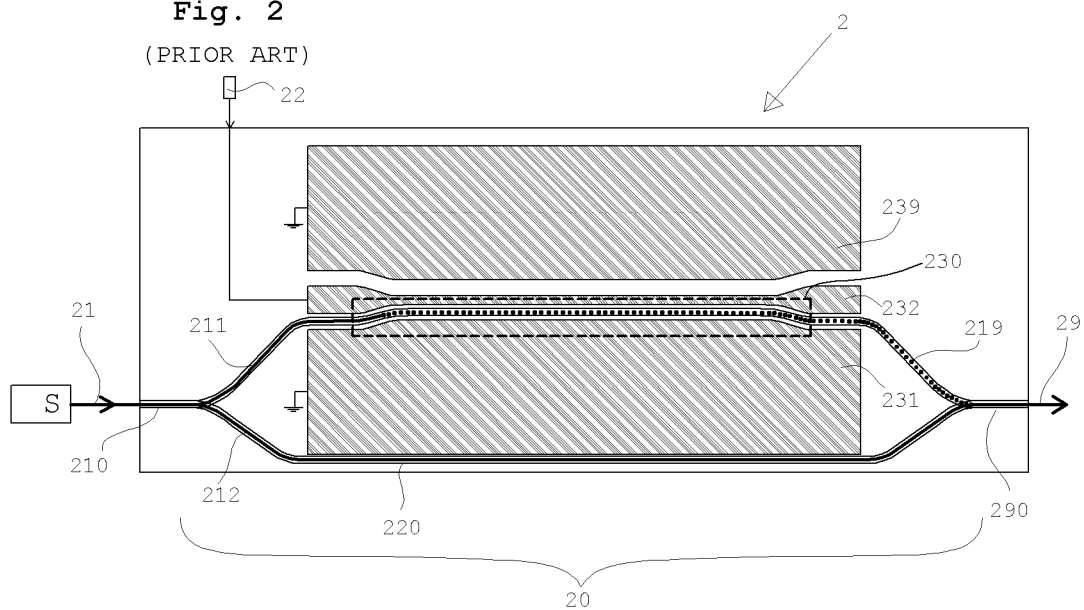
FIG. 2 is a top view illustrating an example of prior art making a modulator from a side diode, such as that of FIG. 1, implanted within an asymmetric Mach Zehnder interferometer, such as illustrated in document WO 2005/093480.
Figure 3:
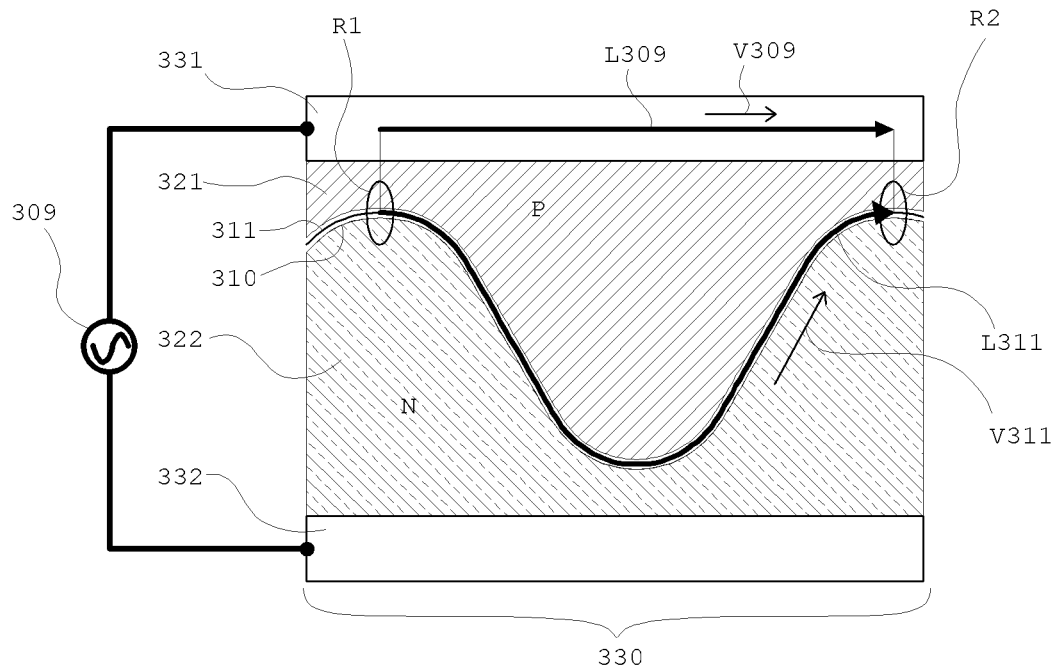
FIG. 3 to FIG. 5 are top view schemes not drawn to scale which illustrate a right embodiment of the invention wherein the control elements fully surround the layout of the wave guide.
Figure 4:
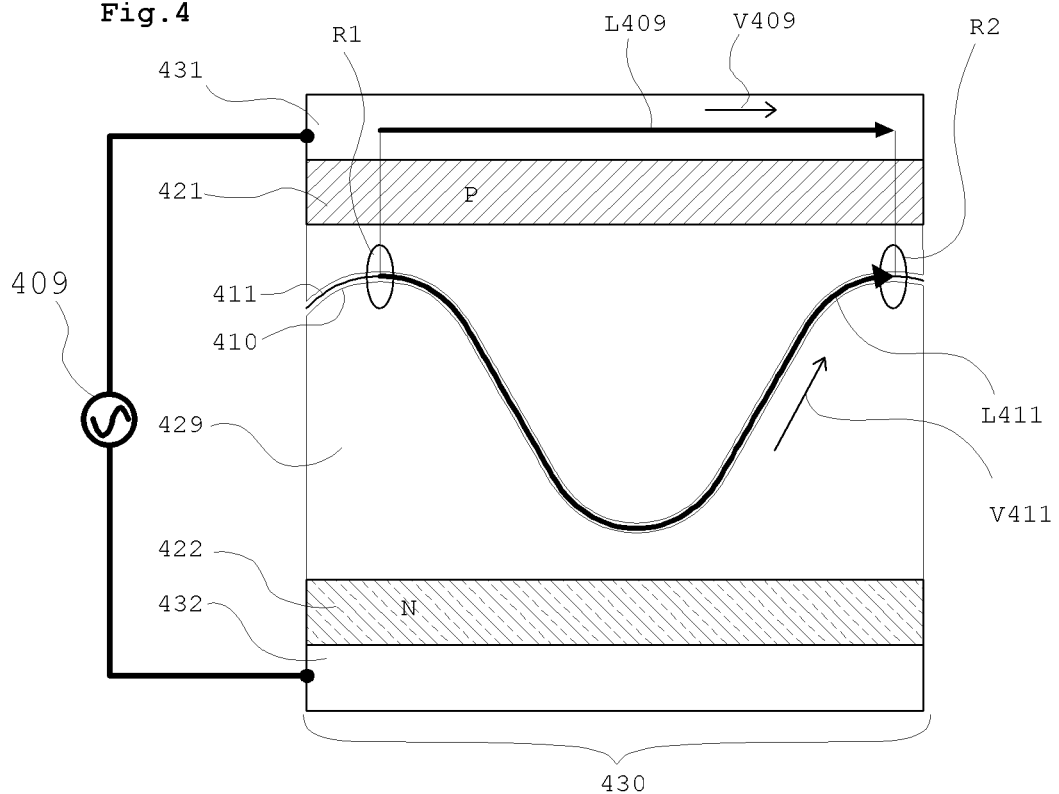
Figure 5:
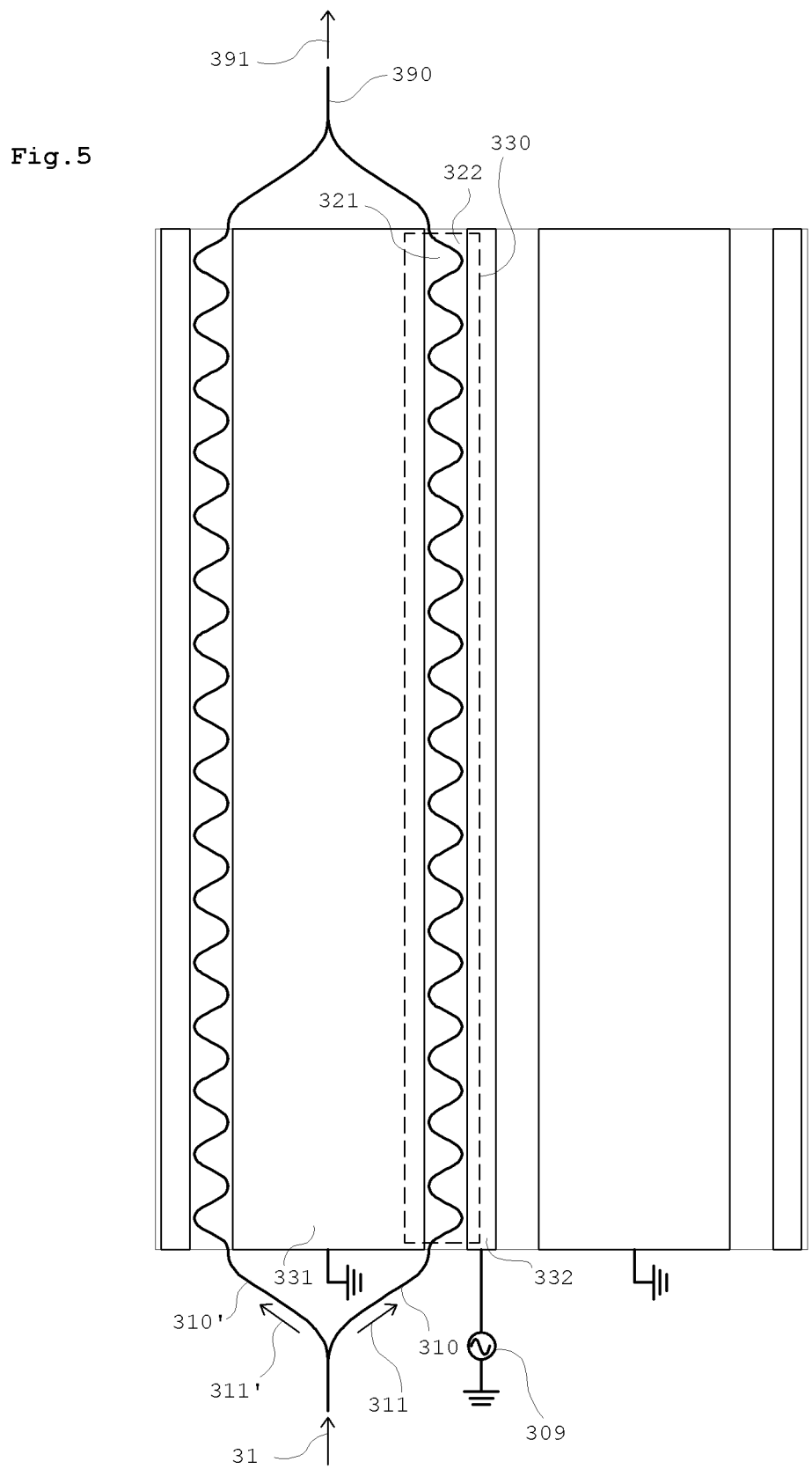

A so-called right embodiment is illustrated in reference to FIG. 3 to FIG. 5, wherein the control elements fully surround the layout of the wave guide. In the examples of this embodiment described herein, the longitudinal layout of the wave guide has an undulated shape, calculated to have a length enabling the difference in velocities of propagation to be decreased or compensated for.

FIG. 3 represents part of the modulation area in an alternative where control elements form a PN type diode.

A wave guide 310 is made within a layer of semi-conducting material, for example a single crystal semiconductor such as silicon. A first control element 321 and a second control element 322 form a pair of electric control elements, and are made on either side of the wave guide 310, and surround the same on either side. For example, one of these control elements is a "P" doped silicon part 321, and the other is a "N" doped silicon part 322.

The separation between both control elements 321 and 322 substantially follows the layout of the wave guide. As illustrated in the figure; the limit between both control elements can for example be shifted on one side of the wave guide, which is then entirely encompassed in one of both control elements. Both control elements can also be adjoined within the wave guide.

Both control elements 321 and 322 receive a control electric signal 309 through two electrodes 331 and 332 respectively, for example metal electrodes parallel to each other. Thus, both control elements 321 and 322 form together a PN modulation diode, which is controlled by the control electric signal 309.

When a light flux 311 to be modulated penetrates the wave guide 310, herein to the left of the figure, the optical characteristics of the material of the wave guide are changed by the electric fields formed within the control diode, depending on a vertical direction on the figure. At each point of the wave guide, the control diode thus interacts with the light flux 311 to modulate the characteristics thereof, for example the phase in the present example.

Within the control electrodes 331 and 332, and thereby within the control elements 321 and 322, the control electric signal rectilinearly advances along the longitudinal direction determined by the position of the electrodes with respect to each other, for example from left to right on the figure.

The wave guide 310 is made according to known techniques, for example a longitudinal ridge projecting on the top of a silicon layer, or through lithographic treatment changing the optical characteristics such as the reflective index of a particular region of this layer.

According to the invention, this wave guide is made according to a drawing determined between the electrodes and the control elements, for example being non-rectilinear and forming an undulation as illustrated herein.

As seen in the figure, between any first interaction region R1 and any second interaction region R2 both located on the wave guide 310, the light flux 311 travels a certain length L311, at its velocity propagation V311.

On the other hand, between these two regions R1 and R2, the control electric signal travels a certain length L309 according to its velocity of propagation V309.

By providing for the wave guide a non-rectilinear layout L311, for example longer than and in any case different from the layout L309 of the control signal between these two interaction regions R1 and R2, the invention thus enables the differences between these different velocities of propagation V311 and V309 to be compensated for.

From these differences in velocities of propagation V311 and V309, a layout is chosen and calculated to provide the difference in lengths L311 and L309 enabling the desired compensation to be obtained, or this difference in velocities to be desirably decreased.

FIG. 4 represents part of the modulation area in an alternative where control elements form a PIN type diode, and will only be described herein as to its differences with respect to FIG. 3.

This PIN diode is formed by the control elements 421 and 422 which form a pair of electric control elements, and are made on either side of the wave guide 410, and surround the same on either side. For example, one of these control elements is a "P" doped silicon part 421, and the other is a "N" doped silicon part 422.

FIG. 5 represents two modulations areas with a PN diode such as that of FIG. 3, symmetrically provided within the Mach Zehnder interferometer of an asymmetric modulator.

A modulation area 330 is controlled by the electric signal 309, through the electrodes 331 and 332. These are provided at the surface of a doped semiconductor layer in different ways to form a first control element 321 and a second control element 322, surrounding the wave guide 310 of this modulation area 330.

The light flux 31 the intensity of which is to be modulated is injected in a wave guide which is separated into a flux 311 to be phase modulated travelling the phase modulation wave guide 310, and a reference flux 311' travelling a wave guide forming a reference branch 310'.

At the output of the modulation areas, both fluxes gather in an intensity modulated flux 391 travelling an output wave guide 390.

Control Elements Crossing the Wave Guide

A so-called wound embodiment is illustrated in reference to FIG. 6 to FIG. 9, which will only be described as to theirs differences with respect to the preceding embodiment. In this wound embodiment, a PN diode is formed by control elements which have a substantially radial interdigitated structure, through which the layout of the wave guide passes several times. In the examples of this embodiment described herein, the layout of the wave guide has all or part of a spiral shape, calculated to have a length enabling the difference in velocities propagation to be decreased or compensated for.

In the exemplary embodiments illustrated in the figures, the wave guide 610, 690, 790 or 990 is arranged so that the path followed by the light flux has a spirally wound part passing successively through emanations 601, 602 and 901, 902 of the control elements 621, 622 and 921, 922, being substantially radial and interleaved with each other. These emanations extend:

from one 622 and 922 of the control elements mostly located inside said spiral on the one hand, and from the other 621 and 921 of the control elements mostly located outside and around the spiral on the other hand.

Other embodiments not represented here can also be considered, as for example a plurality of sandwiched indentations parallel to each other (as illustrated in FIG. 12). A same wave guide can thus follow a plurality of loops, one of which passes through these indentations rectilinearly and perpendicular to the indentations, in the same direction for each of these loops or for most of them.

Figure 6:
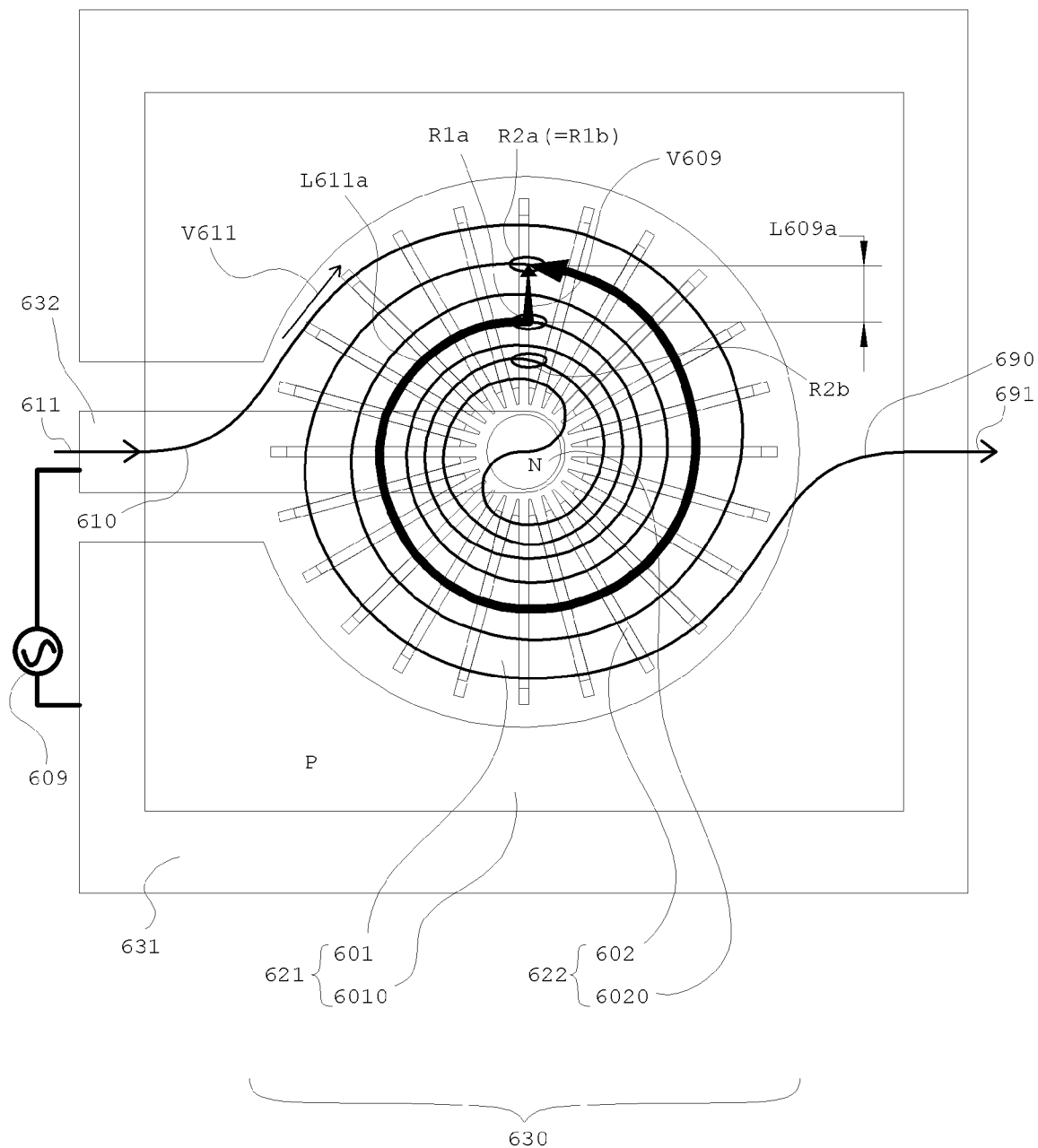
FIG. 6 to FIG. 9 illustrate different alternatives of an embodiment wound with the PN diode wherein the control elements have a substantially radial interdigitated structure crossing the spiral layout of the wave guide.

FIG. 6 illustrates an alternative with concentric control elements 621 and 622, wherein the wave guide is wound in an input spiral and about-turns to leave in an output spiral sandwiched in the input spiral. For the purpose of clarity, FIG. 8 proposes a representation restricted to the control elements and electrodes of FIG. 6.

A first control element 621, for example "P" doped silicon, has a peripheral part 6010 surrounding a recess, for example completely as in this example, but also possibly incompletely as illustrated later.

A second control element 622, for example "N" doped silicon, has a central part 6020, being in this example substantially circular. Branches forming indentations 602 extend outwardly from this central part 6020, in this example as radial branches with a constant width.

The peripheral part 6010 of the first element 621 surrounds the central part 6020 of the second control element 622. This peripheral part 6010 has indentations 601 extending inwardly to substantially complementarily fill spaces between the outside branches 602 of the second element 622.

The inward indentations 601 of the first control element 621 and the outward indentations 602 of the second element 622 are thus sandwiched or "interdigitated" between each other. Each separation between an inside indentation 601 and an outside indentation 602 thus locally forms a control diode.

In this example, the length of these indentations 601 and 602 is slightly lower than the available space, leaving a void or a neutral or non-doped part at the ends of these indentations which can decrease the accuracy constraints and simplify manufacturing, but also limit the interference risk in these end areas.

In an alternative not represented, the control elements can also be separated by a neutral or non-doped area on their entire contact perimeter, thereby forming PIN type control diodes.

The first control element 621 is contacting a first electrode 631, for example as a metal layer deposited onto the semiconductor layer forming this control element. This metal layer of the first electrode 631 has a recess on the entire central part including the interdigitated indentations, as well as an opening on part of its periphery.

By this opening, a metal layer provided on an insulating intermediate layer penetrates from outside the modulation area 630 and extends up to the central area 6020 of the first control element 622. The inside end of this second electrode 632 is contacting the second control element 622 by this central part 6020, thanks to an interruption of the insulating intermediate layer.

The first electrode 631 and the second electrode 632 are thus readily accessible from the outside of the plate carrying the modulation area, and enable the modulation to be controlled through both control elements 621 and 622 when an electric control signal is applied thereto.

A wave guide is made in a curvet path passing through all or part of these indentations 601 and 602 interdigitated between each other, and thus all or part of thus formed diodes. In the alternative herein described, the path of this wave guide has a first part 610 wounding inwardly, for example in a spiral according to a determined formula. In the central region 6020, this path forms an about-turn followed by a second part 690 which unwinds outwardly while being sandwiched between volutes of the first part, for example in a spiral according to a determined formula.

This layout in winding and unwinding volutes thus allows the obtention of a great length of the wave guide passing through control diode forming areas a great number of times, the whole in a compact surface area space. The layout of volutes of the first part 610 and the second part which are interleaved with each other enables in particular all the layout to be preserved substantially in a same planar semiconductor layer, which contributes to simplify the manufacture.

Thus, it can be seen that the path travelled by a light flux 611 to be modulated introduced in the wave guide 610 passes, on the path 690 of the output spiral, through at least one first interaction region R1$a$ corresponding to the region of a first passage of a light flux from one control element to the other control element. In the figure, such a first interaction region R1$a$ is illustrated for example when it passes from an inside indentation 601 of the first control element 621, being herein "P" doped, to an outside branch 602 of the second control element 622, herein being "N" doped.

In the same way, this path passes a little farther through a second interaction region R2$a$ corresponding to the region of the second passage of the light flux from one control element 621 to the other control element 622. In the figure, such a second interaction region R2$a$ is for example illustrated when this path passes from an inside indentation 601 (the same or another) of the first control element 621, herein being "P" doped, to an outside branch 602 of the second control element 622, herein being "N" doped.

As illustrated, the location of this second region R2$a$ (with respect to R1$a$) can in turn be considered as a first interaction region R1$b$ with respect to another interaction region R2$b$ located even farther on the path of the light flux 611.

As can be seen in the figure, the path travelled by the light flux 611 at the velocity V611 between the first region R1$a$ and the second region R2$a$ has a length L611$a$, which is greater than the length L609$a$ (which is thus lower) travelled at the velocity V609 by the control electric signal between both regions R1$a$ and R2$a$.

This difference in length of the paths travelled by the light flux and by the control signal enables the difference between their respective velocities of propagation V611 and V609 to be compensated for or decreased, and thus the drawbacks related to this velocity difference to be restricted or suppressed.

According to one feature, the path travelled by the light flux 611 thus has an elongated loop, being curved on itself without crossing itself, and spirally wound passing successively through substantially radial emanations 601 and 602 interleaved with each other. These emanations respectively extend:

from one 622 of the control elements mostly located inside said spiral of the one hand, and from the other 621 of the control elements mostly located outside and around the spiral.

Figure 7:
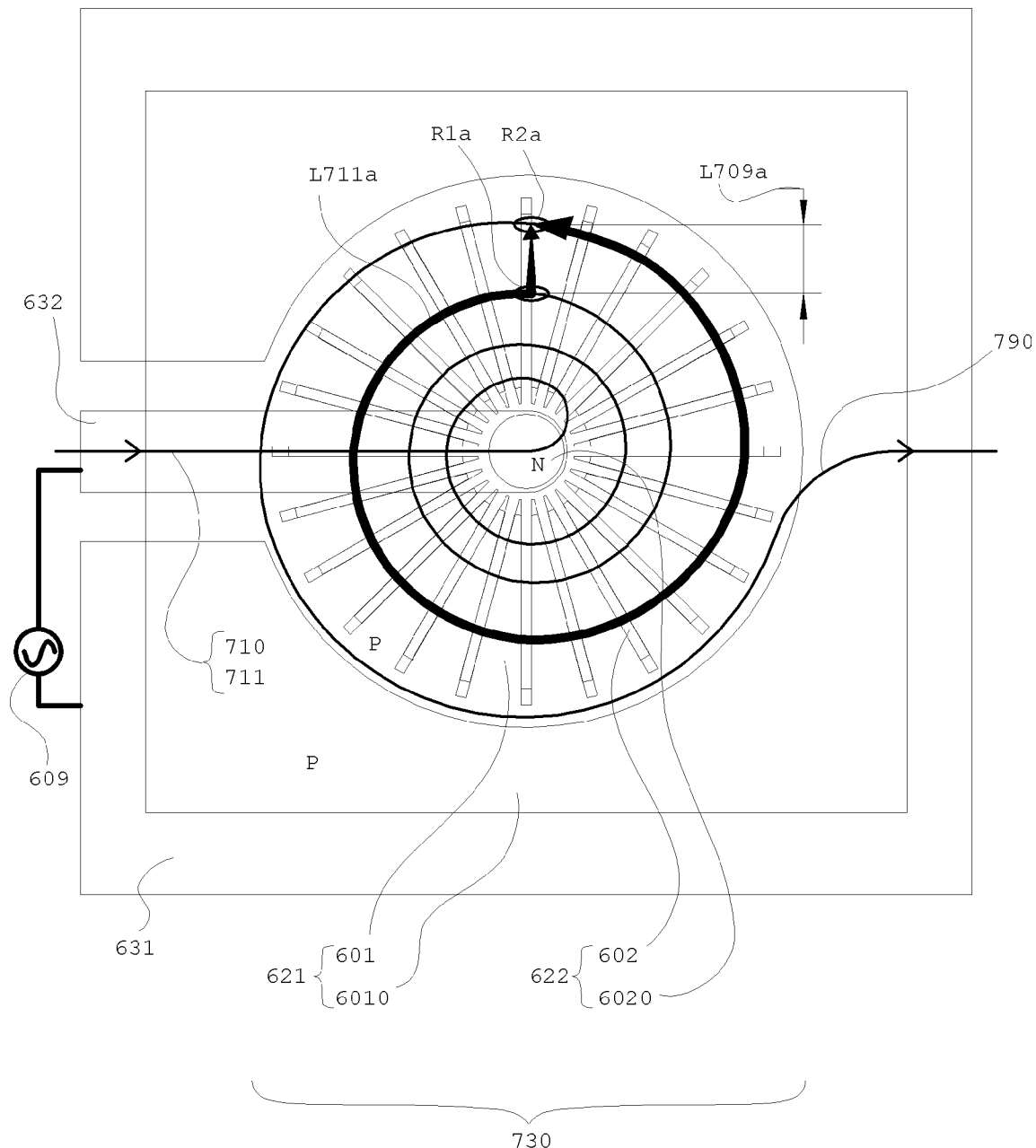
Figure 8:
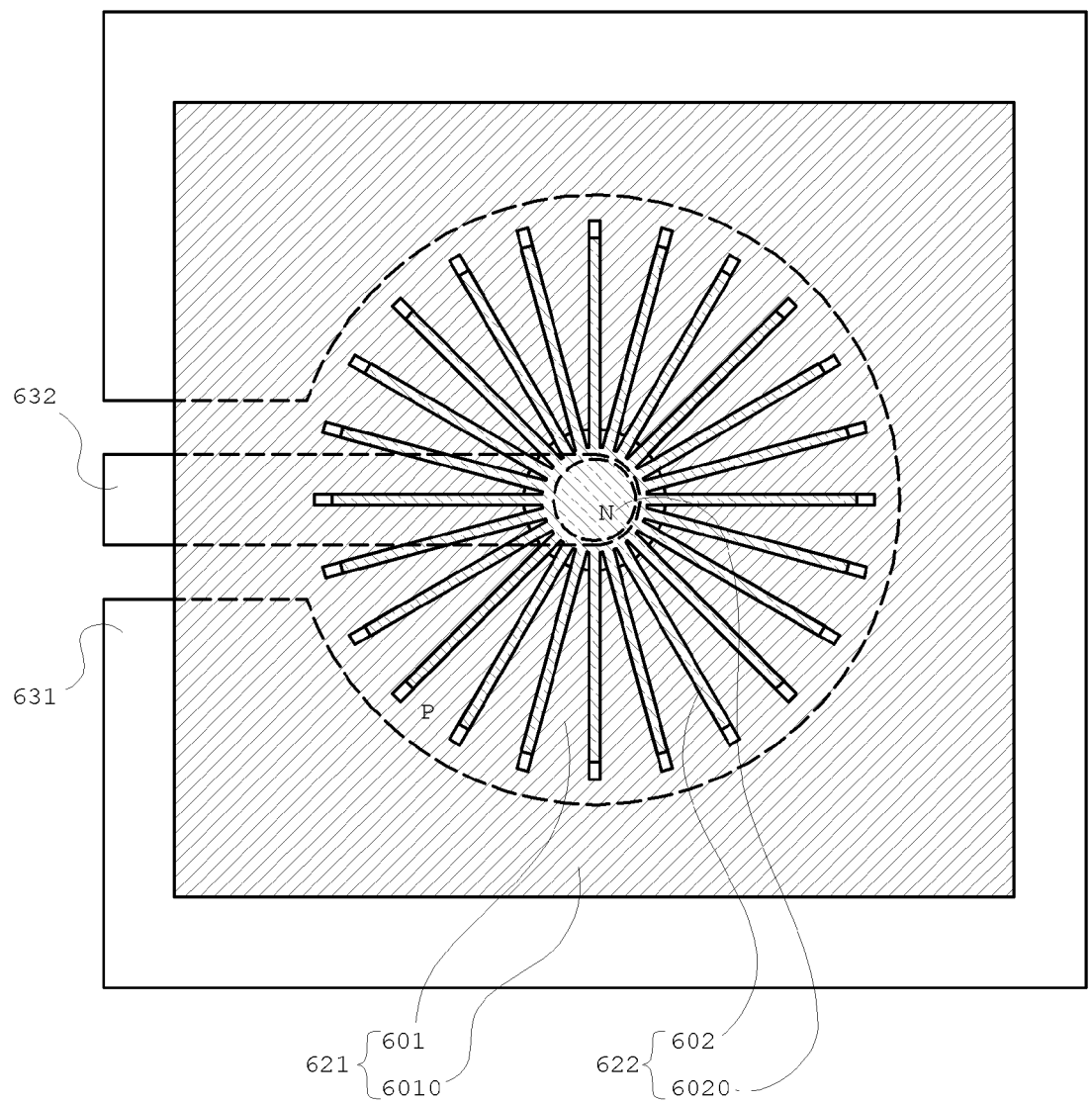

FIG. 7 illustrates an alternative with concentric control elements 621 and 622, wherein the wave guide comes from the centre and describes a spiral outwardly. The representation of the control elements and electrodes of FIG. 8 can also be applied to the alternative illustrated in FIG. 7, and only the differences with the alternative of FIG. 6 will be described herein.

The light flux 711 to be modulated comes from the wave guide which penetrates a first part 710 up to the central part 6020 of the second control element 622, for example substantially radially. From this central part, the wave guide has a second part 790 which unwinds outwardly, for example in spiral according to a determined formula, by successively passing several times through the interdigitated indentations 601 and 602 of the control elements 621 and 622.

As can be seen in the figure, the path travelled by the light flux 711 between a first interaction region R1$a$ and a second interaction region R2$a$ has a length L711$a$, which is greater than the length L709$a$ travelled by the control electric signal between these both regions R1$a$ and R2$a$. This difference in length of the paths travelled by the light flux and the control signal enables the difference between their respective velocities of propagation to be compensated for or decreased, and thus the drawbacks related to this velocity difference to be restricted or suppressed.

Penetration of the wave guide into its first part 710 up to inside the spiral is made without crossing their digitated indentations, or by crossing less than in the output spiral. This direct penetration can enable interferences or disturbances which would be caused by the travel of the spiral inwardly in the alternative of FIG. 6 to be restricted. This penetration can be made by a crossing of wave guides 710 and 790, or by making them at different depths from each other in a same layer or even in different layers.

Figure 9:
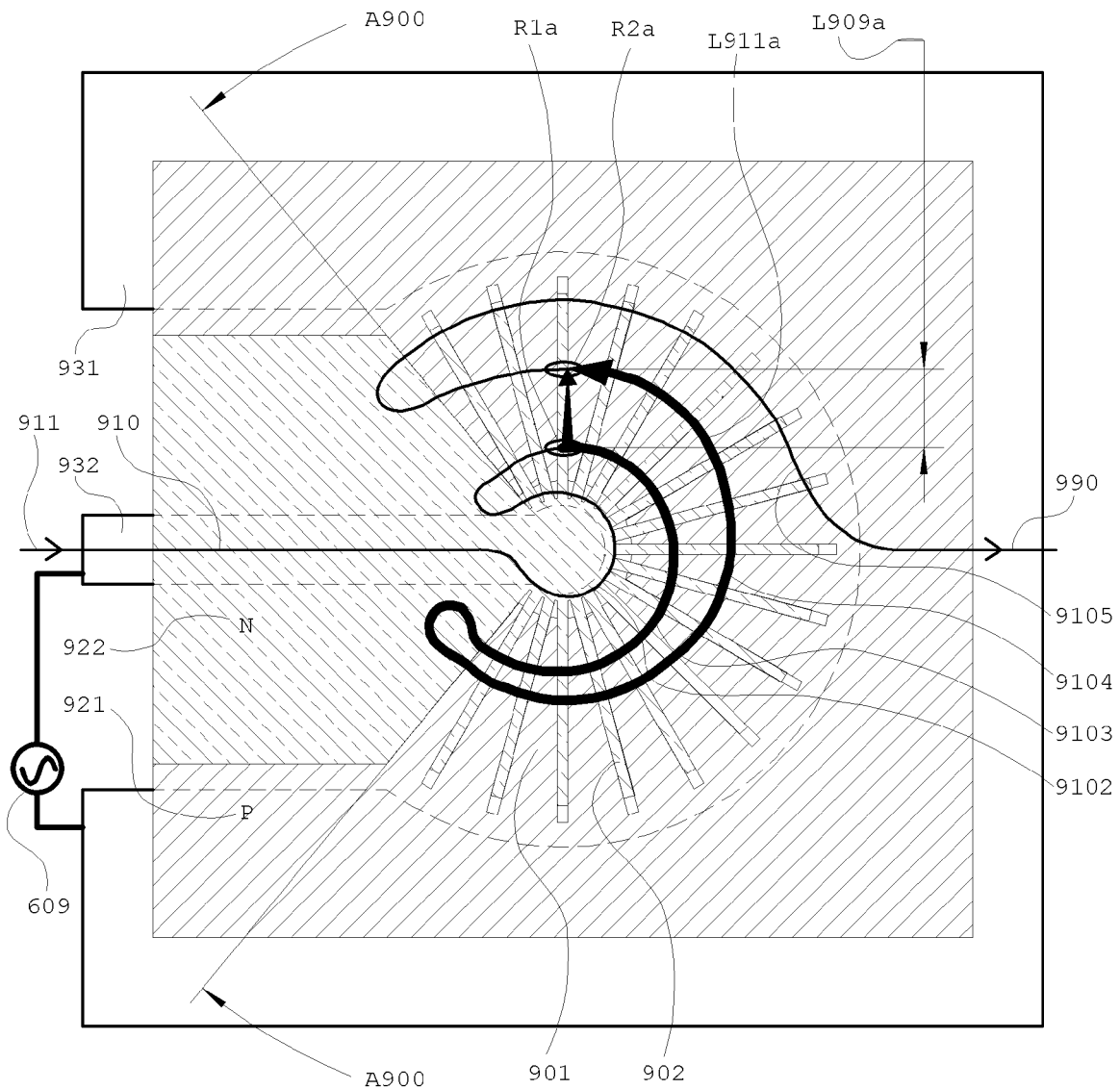

FIG. 9 illustrates an alternative with juxtaposed control elements wherein the wave guide comes from the centre and describes alternated spiral portions outwardly. This alternative will only be described as to its differences with respect to those of FIGS. 6, 7 and 8.

With respect the structure of FIG. 7, the control elements have common characteristics but do not completely surround each other.

A first control element 921 surrounds a second control element 922, but only partly and on an angular sector A900 lower than 360°, more than 180°, or even 270° or more. In this modulation angular sector A900, both control elements have the same type of sandwiched indentations 901 and 902 as above.

The wave guide 910 penetrates up to the central part 902 of the second control element 922, and then starts with a first curved portion 9102 spirally outwardly, on the modulation angular sector A900. Upon output from this angular sector, this wave guide about-turns and penetrates again therein in a new portion 9103 of reverse spiral outwardly again. The wave guide thereby travels a plurality of successive alternated portions of spiral portions 9104 and 9105 in the modulation angular sector A900, before outputting 990 on the right of the figure.

Within this modulation angular sector A900, between a first region R1a and a second region R2a, for example on the same indentation, the optical signal travels a path of length L911a whereas the control electric signal travels a path of length L909a which is shorter, which enables differences in velocities of propagation between both signals to be compensated for or restricted.

This configuration allows a compact efficient structure which is easy to manufacture. It does not include crossing between different parts of the light wave guide, and all the control elements are accessible from outside the modulation area, which simplifies the placement of electrodes 931 and 932 since it is no longer necessary to use an insulating intermediate layer to separate the first control element 921 from the second control electrode 932.

Preferably, the spiral shape used is determined as a function of different characteristics of velocity of propagation.

In the case of the silicon based optoelectronics, and in spirals such as described above, the electric wave is propagated with a velocity lower than that of light, in a radial manner.

The optical wave should thus follow a particular path allowing it to travel at the same apparent velocity as the electric wave between these two successive interaction regions.

For a radial propagation of the electric wave, the invention provides a path forming a spiral of the equation:

$$o(t) = \frac{ct}{n_{\mathit{eff},com}} \times \exp\left(j\sqrt{\frac{n^2_{\mathit{eff},com}}{n_{\mathit{eff}}} - 1} \ln(t)\right)$$

wherein:
"o(t)" is a complex number representing coordinates of points of the spiral as a function of time "t",
"$n_{\mathit{eff}}$" is the effective index in the wave guide, and
"$n_{\mathit{eff},com}$" is the effective index in the control elements.

In FIG. 10 and FIG. 11 are presented measurement results of charge density distribution within control elements for the wound embodiment, in part of one of the sandwiched indentations 601 and 602.

These images show how the voltage variations due to the control electric signal change the electric fields in the control elements, and thereby control the interaction with the optical characteristics of the semi-conducting materials 621 and 622 through which the region making up the wave guide 610, 690 and 710 passes.

FIG. 12 illustrates the positioning of these measurements within the structure of the control elements 621 and 622, in an alternative where the indentations are provided parallel to each other.

Of course, the invention is not restricted to the examples just described and numerous alterations can be made to these examples without departing from the scope of the invention.

The invention claimed is:

1. An electrooptical component for modulating a light flux as a function of a control electrical signal, the component comprising:
   a wave guide including disconnected opposing ends, an input at one of said ends and an output at another of said ends, wherein the light flux is provided to the input and travels once through said wave guide from said input to said output;
   a modulation area in which the light flux is propagated in said wave guide and is subjected to the action of at least one first element and at least one second element of semi-conducting materials forming a pair of electric control elements receiving said control electric signal,
   said wave guide being arranged so that, in said modulation area, from at least one first region to at least one second region of interaction between the light flux and said pair of electric control elements a length of a path travelled by the light flux is different from a length of a path travelled by the control electric signal, said length difference being determined to decrease or compensate for the difference between the light flux velocity of propagation and the electric signal velocity of propagation in the electric control elements between said first and second regions of interaction;
   said wave guide is arranged so that the path travelled by the light flux in the modulation area passes at least twice from one electric control element to the other electric control element; and
   said wave guide has, in at least one part of the modulation area, a shape wound on itself and successively passing through at least two indentations emanating from at least two of said electric control elements.

2. The component according to claim 1, wherein at least two of said electric control elements have, facing each other, a shape comprising indentations through which said wave guide successively passes, wherein the wave guide has a shape wound on itself in at least one part of the modulation area.

3. The component according to claim 1, wherein said wave guide is arranged such that the path travelled by the light flux has a part spirally wound passing successively through substantially radial emanations of the electric control elements that extend from one of the electric control elements mostly located inside said spiral, and from the other one of the electric control elements mostly located outside and around the spiral.

4. The component according to claim 3, wherein said wave guide is arranged such that the path travelled by the light flux has an elongated and spirally wound loop passing successively through substantially radial emanations of the electric control elements wherein the emanations extend from one of the electric control elements mostly located inside said spiral, and from the other one of the electric control elements mostly located outside and around said spiral.

5. The component according to claim 1, wherein said wave guide has a part penetrating inside the spiral by crossing one or more volutes.

6. The component according to claim 1, wherein a layout of said wave guide has a succession of substantially concentric spiral curved portions, wherein said wave guide passes successively through substantially radial emanations of the electric control element wherein the emanations extend from one of the electric control elements mostly located inside said curved portions, and from the other one of the electric control elements mostly located outside and around said curved portions.

7. The component according to claim 3, wherein the spiral has a shape defined by the following formula:

$$o(t) = \frac{ct}{n_{\mathit{eff},com}} \times \exp\left(j\sqrt{\frac{n_{\mathit{eff},com}^2}{n_{\mathit{eff}}} - 1} \ln(t)\right)$$

wherein:
- "o(t)" is a complex number representing coordinates of points of the spiral as a function of time "t",
- "j" is the unit imaginary number, for which $j^2 = -1$;
- "c" is a constant equal to the speed of light in a vacuum;
- "$n_{\mathit{eff}}$" is the effective index in the wave guide, and
- "$n_{\mathit{eff},com}$" is the effective index in the control elements.

8. The component according to claim 1, wherein the path of said wave guide is calculated to compensate for the difference in velocities of propagation to the nearest 10%, or even 5%.

9. A device using or including a component according to claim 8, wherein the device does not comprise any electric circuit or electronic components which compensate differences in velocities of propagation through processing the control signal.

10. The component according to claim 1, wherein the modulation area comprises said wave guide formed in an active region including at least one pair of control elements of the IV type semiconductor, doped so as to form a PN type or PIN diode the refractive index of which varies as a function of said control electric signal applied to its terminals.

11. The component according to claim 1, wherein the modulation area comprises a wave guide formed in an active region surrounded by at least one pair of control elements of semiconductors, said active region including at least one structure with one or more quantum wells made from two different semi-conducting materials of the III-V type, selected to form a couple of band gap semiconductors and thus obtain a variation in the effective refractive or absorptive index in said active region as a function of said control electric signal applied to said control elements.

12. The component according to claim 1, wherein the modulation area has an architecture arranged to vary the phase of the light flux that passes through it as a function of the control electric signal.

13. The component according to claim 1, wherein at least one modulation area is inserted within an interferometer so as to obtain an intensity modulation of the light flux that passes through it from a phase modulation of the light flux passing through said modulation area.

* * * * *